June 11, 1963

E. G. KING III 3,093,238

INSULATED CONTAINER FOR CARRYING OR
STORING HEATED FOOD AND THE LIKE

Filed Feb. 26, 1962

INVENTOR
EDWARD G. KING, III

BY *Leonard Bloom*

ATTORNEY

June 11, 1963 E. G. KING III 3,093,238
INSULATED CONTAINER FOR CARRYING OR
STORING HEATED FOOD AND THE LIKE
Filed Feb. 26, 1962 2 Sheets-Sheet 2

INVENTOR
EDWARD G. KING, III

BY Leonard Bloom
ATTORNEY 3,093,238
INSULATED CONTAINER FOR CARRYING OR
STORING HEATED FOOD AND THE LIKE
Edward G. King III, 1004 Wedgewood Road,
Baltimore 29, Md.
Filed Feb. 26, 1962, Ser. No. 175,663
3 Claims. (Cl. 206—4)

The present invention relates to an insulated container for carrying or storing a variety of foods, and more particularly, to such a container that houses a plurality of receptacles within each of which a different heated food may be placed initially by the user.

It is an object of the present invention to provide means for carrying or storing one or more frozen "pot pies" that are heated by the user, as in an oven, and then are placed (while hot) within the container for subsequent eating four to six hours hence.

It is another object of the present invention to provide an insulated container that is compact and lightweight, that may be manufactured easily and economically from readily-available materials, such as plastic foam, and that be carried easily by the user from place-to-place.

It is yet still another object of the present invention to provide an insulated container that houses a plurality of receptacles, each of which is identical to the other, wherein the receptacles are stacked one on top of another, and wherein the stack of receptacles, as a unit, may be slidably removed from the container quickly and easily.

It is yet a further object of the present invention to provide means for quickly interlocking and stacking the receptacles together, whereby the base portion of one receptacle forms a cover for the receptacle which is beneath it, and whereby the receptacles may be easily disengaged from one another by merely manually lifting the receptacles off one another, in sequence, to uncover the pre-heated foods that were initially placed in the receptacles.

It is yet a still further object of the present invention to provide an insulated container, wherein all or just a few of the receptacles may be employed by the user at any one time, wherein the receptacles may be purchased at a very low initial cost, and wherein new receptacles may be used with the original container.

In accordance with the teachings of the present invention, a preferred embodiment is herein illustrated and described, wherein a jacket is provided which has an open top and an open bottom, and wherein a bottom cover is detachably secured to the open bottom of the jacket. A plurality of receptacles, stacked one on top of another, are slidably received within the jacket and rest upon the bottom cover. Either the jacket or the receptacles, or preferably both, is suitably insulated. The receptacles are inserted, in sequence, through the open top of the jacket. One or more (or all) of the receptacles may contain a frozen "pot pie" or equivalent frozen food dinner that is pre-heated directly in its alluminum foil, or other package, to a suitable temperature. The other receptacles may contain a hot liquid, such as soup or coffee, or else serve as a convenient place to store various utensils and condiments. Once the receptacles have been placed within the jacket, a top cover is detachably secured to the jacket to hold the stack of receptacles rigidly against the bottom cover. For manufacturing convenience and economy, the top cover and bottom cover may be identical to each other, and the receptacles may also be identical to each other. When the user desires to eat the food, the bottom cover may be removed from the jacket, and the jacket may be placed in a substantially upright position and placed on a table or similar surface and lifted vertically to allow the receptacles, stacked one upon another, to be slidably removed from the jacket. Thereafter, the receptacles may be lifted off one another and spread out on a table to enable the user to enjoy a hot and delicious meal, which may be eaten directly out of the receptacles.

These and other objects of the present invention will become apparent from a reading of the following specification, taken in conjunction with the enclosed drawings, in which.

Figure 1:
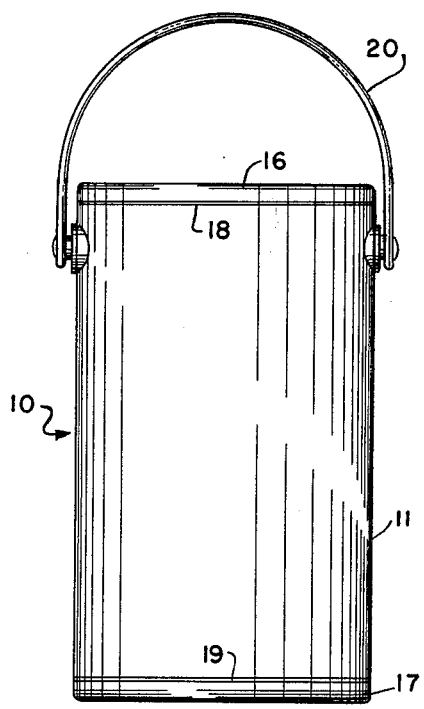
FIGURE 1 is a side elevational view of the complete insulated container, showing the handle in its raised position for easily carrying the container from place to place.
Figure 2:
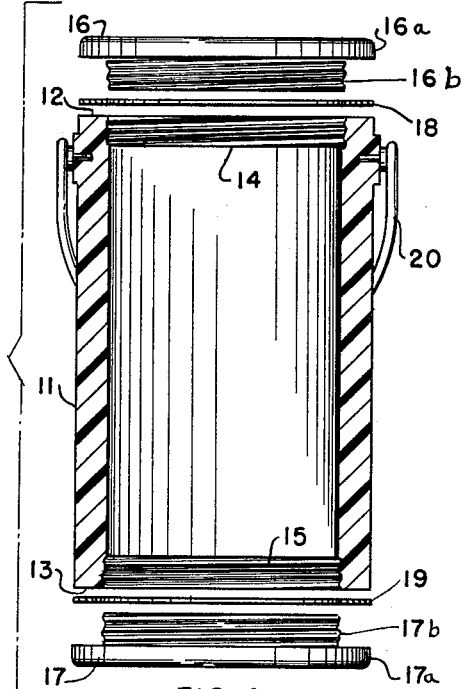
FIGURE 2 is a longitudinal section of the jacket portion of the container, showing the detachable top and bottom covers and the associated gaskets in elevation and is exploded relationship to the jacket.

With reference to FIGURES 1 and 2, there is illustrated an insulated container 10 including a jacket 11, formed preferably as a sleeve, and having an open top 12 and an open bottom 13. Internal threads 14 and 15, which are preferably coarse, are formed within the top 12 and bottom 13, respectively, so as to detachably receive the top cover 16 and bottom cover 17, respectively. For manufacturing convenience, the top cover 16 and bottom cover 17 may be identical to each other, comprising a flange portion (16a and 17a) which rests upon the end of the jacket or sleeve 11 and an integral body portion (16b and 17b) which is threadably received within the sleeve 11. Also, a pair of gaskets 18 and 19 may be employed and may be adhesively secured either to the jacket 11 or to the top and bottom covers 16 and 17, respectively. Moreover, a handle 20 is secured to the jacket 11 for easily carrying the container from place to place.

Figure 3:
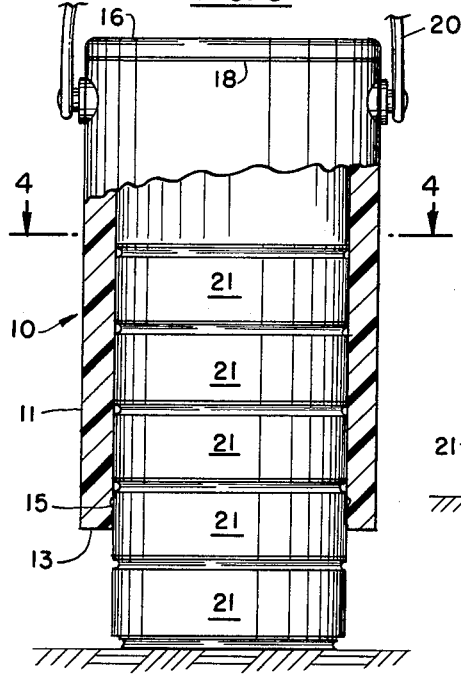
FIGURE 3 is a side elevational view of the container with part of the jacket broken away and sectioned to show the stack of receptacles being slidably removed from the jacket.
Figure 4:
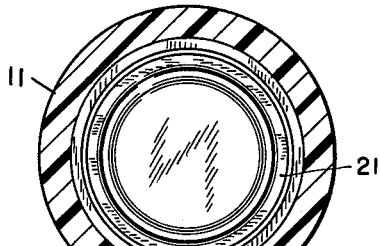
FIGURE 4 is a sectional view taken across the lines 4—4 of FIGURE 3.

With reference to FIGURES 3 and 4, a stack of receptacles 21 is slidably received within the jacket 11. The receptacles 21 are interconnected, one on top of another, and may be slidably removed, as a unit, from the jacket 11. The bottom cover 17 is removed from the jacket 11, and the container 10 is placed in an upright position and lifted vertically such that the jacket 11 is lifted off, as the stack of receptacles 21 remains on the table or other flat surface.

Figure 7:
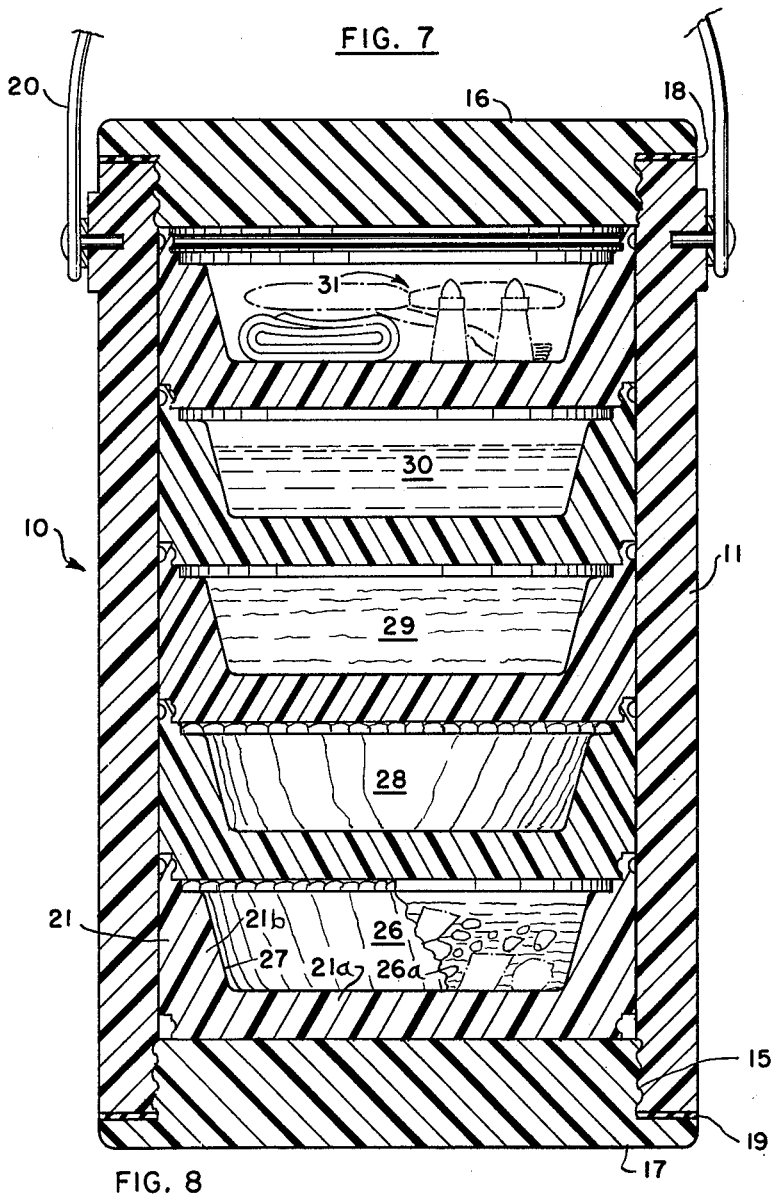
FIGURE 7 is an enlarged longitudinal section of the complete container.
Figure 8:
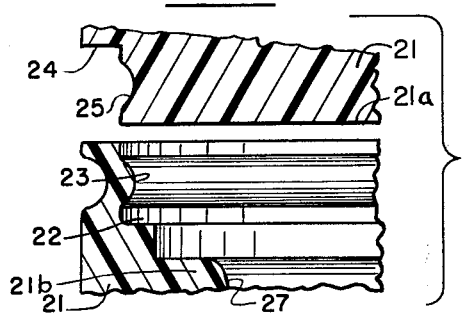
FIGURE 8 is an enlarged sectional view of a fragmentary portion of one receptacle in exploded relation to its mating receptacle, showing the means for interconnecting the receptacles together.

With reference to FIGURES 7 and 8, each of the receptacles 21 is identical to the other and comprises a disc-shaped substantially-flat base portion 21a and an annular wall portion 21b which is integral with the base portion 21a and extends upwardly therefrom. As shown more particularly in FIGURE 8, the wall portion 21b has an annular ledge 22, and an internal annular protrusion or hump 23 is formed in the remaining wall portion 21b or the receptacle 21. The base portion 21a of each receptacle 21 has an annular relief 24 formed therein, and the remaining portion of the base 21a has an external annular groove 25 formed thereon. Consequently, the receptacles 21 may be stacked one on top of another such that the internal annular hump 23 of one of the receptacles 21 will be received within the external annular groove 25 of the receptacle 21 which is above it, and so on throughout the receptacles 21 as shown in FIGURE 7, with the result that the receptacles 21 are interlocked or interconnected together. The receptacles 21 may be made from a suitable material, such as plastic, which will have a certain amount of "give" or flexibility, such that a slight interference fit will be developed between the mating receptacles 21. Yet this interference fit will be such as to allow the receptacles 21 to be manually disengaged or lifted off one another in sequence.

Figure 5:
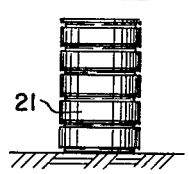
FIGURE 5 is a side elevational view, in reduced scale, of the stack of receptacles removed from the jacket.

In FIGURE 5, a total of five receptacles 21 is shown, but it will be appreciated that the precise number of receptacles 21 that is used is not critical to the invention, nor is it mandatory that all of the receptacles 21 be used at any one time. For example, as shown in FIGURE 7, the first of the receptacles 21—starting from the bottom and working upwards—may contain a frozen "pot pie" that was heated by the user prior to insertion within the container 10.

These frozen "pot pies" are readily available in groceries and supermarkets and comprise a pre-packaged aluminum container, within which a beef stew or other food is placed, and over which an aluminum foil is placed. The user removes the "pot pie" from his freezer and heats it to a desired temperature, as by heating the "pot pie" (complete in its aluminum package) in an oven at a temperature of roughly 400° F. or whatever temperature is recommended by the manufacturer. The heated "pot pie" 26 is then removed from the oven and placed in one of the receptacles 21, the annular wall 21b of which may be tapered (as at 27) for closely fitting the corresponding taper that is presently placed on the package for the "pot pie" 26. The receptacle 21 (containing the heated "pot pie" 26) is then inserted through the open top 12 of the jacket or sleeve 11 and slidably lowered within the jacket 11 to rest upon the bottom cover 17. As shown in FIGURE 7, the "pot pie" 26 has its aluminum foil 26a broken away for purposes of illustrating the contents of the "pot pie" 26. Another heated "pot pie" (as at 28) may be placed in another of the receptacles 21, which is then lowered within the jacket 11 to rest upon and interconnect with the previous receptacle 21. Thus one receptacle 21 serves as the cover for the one beneath it, and so on throughout the stack of receptacles 21. The frozen "pot pies" presently contain a variety of delicious foods, as for example, a beef stew, a chicken pie, or a turkey pie; and additional foods and recipes will likely be developed in the future, especially in view of the increased use of "pot pies" that is facilitated and sparked by the present invention.

The remaining receptacles 21, as shown in FIGURE 7, may contain hot soup (as at 29), hot coffee (as at 30), and various utensils and condiments (as at 31); or, if desired by the user, all of the receptacles 21 may contain a heated "pot pie". The receptacles 21 are identical to each other, so the order or sequence of placing the receptacles 21 within the jacket 11 is immaterial. Moreover, the versatility of the receptacles 21 in accommodating a variety of heated foods or heated liquids is highly desirable from the user's standpoint. If desired, just one or two of the receptacles 21 need be used, and hot water may be placed in the remaining receptacles 21, thus maintaining the temperature of the one or two heated "pot pies" for an even longer period of time. The frozen "pot pies" may be placed in an oven when the user arises in the morning; and by the time that the user is ready to leave the house to go to work, the "pot pie" will probably be at the desired temperature for insertion within a receptacle 21, thence within the jacket 11 along with whatever else is desired. The container 10 will maintain the heated "pot pie" at a suitable temperature for several hours, such that the "pot pie" will be hot when the user is ready for lunch. Office workers, factory workers, school children, and outdoorsmen are indicative of the potential users of the present invention.

The handle 20 will allow the container 10 to be carried in a position substantially as shown in FIGURES 1 and 7, but the method of holding or carrying the container 10 is not necessarily critical.

Figure 6:
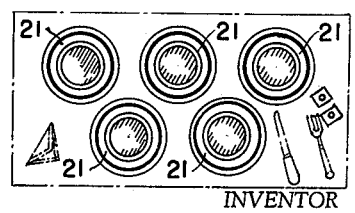
FIGURE 6 is a plan view of the individual receptacles removed from one another and spread out on a table to allow the user to eat the food directly out of the receptacles.

When the user is ready to eat the heated "pot pies" and other foods, say four hours hence, the bottom cover 17 is removed and the container 10 is placed generally in an upright position and suitably supported on a table or other surface as shown in FIGURE 3. Then, the jacket 11 is raised vertically to allow the stack of interconnected receptacles 21 to be slidably removed from the jacket 11. The stack of receptacles 21, as removed from the jacket 11, is shown in FIGURE 5. The user merely disengages the stack of receptacles 21, as by a slight lifting force, and spreads the receptacles 21 out on his table as shown in FIGURE 6. If desired, the food may be eaten directly out of the receptacles 21.

For manufacturing ease and economy, the receptacles 21 as well as the jacket 11 and top and bottom covers 16 and 17, respectively, may be produced from a suitable foamed plastic material, one that is relatively-rigid and of course, non-toxic. However, it will be understood that other insulating materials may be utilized in the manufacture of the container 10.

Moreover, a suitable coating may be deposited on the outside of the jacket 11 (as well as on the receptacles 21) to render the jacket 11 relatively impervious to scratches and bumps; and if further desired, an attractive color or design may be placed on the outside of the jacket 11 for appearance purposes.

Obviously, many modifications may be made without departing from the basic spirit of the present invention; and therefore, within the scope of the appended claims, the invention may be practiced other than has been specifically described.

I claim:
1. An insulated container comprising:
 (a) a cylindrical jacket having a top cover and a bottom cover, at least one of which is detachably secured to the jacket;
 (b) a plurality of open receptacles stacked one on top of another within said jacket and supported on said bottom cover and adapted to be slidably removed from said jacket as a unit;
 (c) each of said receptacles having a closed bottom and an annular wall portion extending upwardly therefrom; and
 (d) means interconnecting said receptacles together, whereby the bottom of one receptacle forms a cover for the receptacle directly beneath it;
 (e) said means comprising an annular ledge formed in the wall of each receptacle to support the bottom of the receptacle which is directly above it;
 (f) an annular protrusion formed in the wall of each receptacle above said ledge, the protrusion being directed radially inwardly of its respective receptacle; and
 (g) said bottom of each receptacle having an external annular groove formed therein to cooperate with the annular protrusion of the receptacle which is directly beneath it.

2. An insulated contained comprising:
 (a) a cylindrical jacket having a top cover and a bottom cover, at least one of which is detachably secured to the jacket;
 (b) a plurality of open receptacles stacked one on top of another within said jacket;
 (c) each of said receptacles having a closed bottom and an annular wall portion extending upwardly therefrom; and at least one of said receptacles being adapted to house a heated frozen food dinner complete in its pre-packaged container;

(d) said one receptacle having a first annular ledge formed in its wall portion to support the bottom of the receptacle which is directly above it;

(e) said one receptacle further having a second annular ledge, below said first annular ledge and radially inwardly of said first ledge, to support the annular lip of the heated frozen food dinner, whereby the lip will be retained between said second annular ledge and the bottom of the receptacle which is directly above it; and (f) disconnectable means interconnecting said receptacles together.

3. An insulated container comprising:

(a) a cylindrical jacket having a top cover and a bottom cover, each of which is threadably secured to said jacket and has a radially-projecting flange seated on the respective end of the jacket;

(b) an annular gasket between each of said flanges and the respective end of the jacket;

(c) a plurality of open receptacles stacked one on top of another within said jacket and supported on said bottom cover and adapted to be slidably removed from either end of said jacket as a unit;

(d) each of said receptacles being identical to the other, whereby said receptacles are completely interchangeable, and each of said receptacles having a closed bottom and an annular wall portion extending upwardly therefrom;

(e) the bottom of one of said receptacles forming a cover for the receptacle which is directly beneath it; and (f) means including an annular groove formed in said one receptacle and a cooperating annular protrusion formed in the bottom of the next-lower receptacle to interconnect said receptacles together.

References Cited in the file of this patent

UNITED STATES PATENTS

| | | |
|---|---|---|
| 2,555,788 | Donaldson | June 5, 1951 |
| 2,663,450 | Bourcart | Dec. 22, 1953 |